(12) United States Patent
An et al.

(10) Patent No.: US 10,302,806 B2
(45) Date of Patent: May 28, 2019

(54) SECURITY DETECTION SYSTEM

(71) Applicant: Tsinghua University, Beijing (CN)

(72) Inventors: Jigang An, Beijing (CN); Peng Cong, Beijing (CN); Xincheng Xiang, Beijing (CN); Litao Li, Beijing (CN); Zhentao Wang, Beijing (CN); Yanmin Zhang, Beijing (CN); Jianmin Tong, Beijing (CN); Weidong Qiu, Beijing (CN); Chunming Tan, Beijing (CN); Yibin Huang, Beijing (CN); Xiaojing Guo, Beijing (CN); Liqiang Wang, Beijing (CN); Jian Zheng, Beijing (CN)

(73) Assignee: Tsinghua University (CN)

( * ) Notice: Subject to any disclaimer, the term of this patent is extended or adjusted under 35 U.S.C. 154(b) by 155 days.

(21) Appl. No.: 15/333,905

(22) Filed: Oct. 25, 2016

(65) Prior Publication Data
US 2017/0343698 A1 Nov. 30, 2017

(30) Foreign Application Priority Data
May 30, 2016 (CN) .......................... 2016 1 0371885

(51) Int. Cl.
*G01V 5/00* (2006.01)
(52) U.S. Cl.
CPC .......... *G01V 5/0033* (2013.01); *G01V 5/0016* (2013.01); *G01V 5/0066* (2013.01)
(58) Field of Classification Search
None
See application file for complete search history.

(56) References Cited

U.S. PATENT DOCUMENTS 6,088,423 A 7/2000 Krug et al.
2004/0258198 A1 12/2004 Carver et al.
(Continued)

FOREIGN PATENT DOCUMENTS

CN 101051029 A 10/2007
CN 102415897 A 4/2012
(Continued)

OTHER PUBLICATIONS

European Patent Office, European Search Report, May 17, 2017, EU Application No. 16194548.0-1559, Tsinghua University.
(Continued)

*Primary Examiner* — Hoon K Song
(74) *Attorney, Agent, or Firm* — Scott D. Swanson; Shaver & Swanson, LLP

(57) ABSTRACT

The present disclosure relates to a technical field of a security detection device, and particularly, to a security detection system, comprising one or more detection devices, wherein the detection device comprises a first ray emitter, a ray receiver, and a movable frame, wherein the first ray emitter comprises a first ray source for generating first detection rays and is provided at a bottom portion of the movable frame, so that the first detection rays can penetrate through a detected object from a bottom of the detected object; the ray receiver comprises a ray detector provided on the movable frame, for correspondingly receiving the first detection rays having penetrated through the detected object; and the movable frame is movable in a direction in which the first ray emitter and the ray receiver are capable of moving through a detection region for the detected object.

28 Claims, 4 Drawing Sheets

(56) References Cited

U.S. PATENT DOCUMENTS

| | | | |
|---|---|---|---|
| 2005/0089140 A1* | 4/2005 | Mario | G01N 23/046 378/57 |
| 2007/0269007 A1* | 11/2007 | Akery | G01N 23/04 378/57 |
| 2008/0025461 A1 | 1/2008 | Foland et al. | |
| 2009/0147913 A1 | 6/2009 | Dragon et al. | |
| 2010/0189226 A1 | 7/2010 | Kotowski et al. | |

FOREIGN PATENT DOCUMENTS

| | | |
|---|---|---|
| CN | 202256704 U | 5/2012 |
| CN | 203324492 U | 12/2013 |
| CN | 105346975 A | 2/2016 |
| CN | 205808968 U | 12/2016 |
| EP | 2987751 A1 | 2/2016 |

OTHER PUBLICATIONS

Korean Patent Office, First Office Action, Aug. 16, 2017, KR Application No. 10-2016-0121579.
First Office Action issued in counterpart foreign application:CN Application No. 201610371885.5.
English-language version of Search Report for counterpart foreign application: CN Application No. 201610371885.5.

* cited by examiner

SECURITY DETECTION SYSTEM

TECHNICAL FIELD

The present disclosure generally relates to a technical field of a security detection device, and more particularly, to a security detection system.

BACKGROUND

A detection system for containers or vehicles loaded with goods is a main detection device needed by the customs.

Nowadays, the commonly used detection device is such an inspection system that a single radiation source is used for radiation imaging. However, an inspection system using one radiation source for radiation imaging can only get simplex and limited information. Moreover, since radiation detection is conducted on the object in only one direction by a single radiation source, the particular shape, size, and density of the detected object cannot be shown stereoscopically, and the types of the detected objects cannot be identified accurately or rapidly. Thus, the inspection system with a single radiation source for radiation imaging has a low ability of recognizing objects, and thus has a poor effect on the security inspection of the containers or vehicles loaded with goods.

An inspection system with two radiation sources for radiation imaging has been known. Generally, the inspection system with two radiation sources for radiation imaging comprises one ray source provided above the object, and the other ray source provided on one side of the object. This structure enables the inspection system to obtain projection information of the object in two directions at the same time, thus making up for the inspection system with a single radiation source for radiation imaging. However, the field angle of the ray source in an overhead lighting system is relatively small, to the disadvantages of spreading out the object in a detector for widely imaging. Moreover, regarding the containers or vehicles loaded with goods, since their sizes are large, the size of the inspection system with two radiation sources for radiation imaging required is also large, such that the inspection system has a very heavy weight and is difficult to move. Therefore, a huge trailer is usually required by the inspection system with this kind of structure to drag dozens of tons of containers or vehicles loaded with goods, to pass through the inspection system, resulting in a complex inspection system with a complicated operation and a high cost.

SUMMARY

An object of the present disclosure is to provide a security detection system comprising a movable ray source, being capable of detecting objects without dragging them, and facilitating the image of the detected object to be spread out.

In order to achieve the above object, the present disclosure adopts the following technical solutions.

According to one aspect of the present disclosure, the security detection system, comprising one or more detection devices, each of the one or more detection devices comprising a first ray emitter, a ray receiver, and a movable frame, wherein the first ray emitter comprises a first ray source for generating first detection rays and is provided at a bottom portion of the movable frame, so that the first detection rays penetrate through a detected object the bottom up; the ray receiver comprises a ray detector provided on the movable frame, for correspondingly receiving the first detection rays having penetrated through the detected object; and the movable frame is configured to carry the first ray emitter and the ray receiver to synchronously move from one end of the detected object to the other end thereof, wherein the first ray emitter is configured to move across the detected object at a central position on a bottom side of the detected object.

According to another aspect of the present disclosure, wherein the first ray source is an isotopic ray source.

According to another aspect of the present disclosure, wherein the isotopic ray source comprises $^{60}$Co, $^{137}$Cs, $^{192}$Ir, or $^{75}$Se.

According to another aspect of the present disclosure, the system further comprises a second ray emitter comprising a second ray source for generating second detection rays, wherein the second ray emitter is provided on the movable frame such that the second detection rays are capable of penetrating through the detected object from a side of the detected object, wherein the ray receiver is configured to correspondingly receive the second detection rays having penetrated through the detected object, and the movable frame is configured to carry the second ray emitter to synchronously move from one end of the detected object to the other end thereof.

According to another aspect of the present disclosure, wherein the second ray source is an isotopic ray source or an X-ray emitter.

According to another aspect of the present disclosure, wherein the isotopic ray source comprises $^{60}$Co, $^{137}$Cs, $^{192}$Ir, or $^{75}$Se, and the X-ray emitter comprises an X-ray machine or an electron accelerator.

According to another aspect of the present disclosure, wherein the first detection rays and the second detection rays both are distributed in a substantially planar fan shape.

According to another aspect of the present disclosure, wherein the first ray emitter and the second ray emitter are configured such that the first detection rays and the second detection rays are located on different planes, and the ray receiver comprises a first detector module for receiving the first detection rays and a second detector module for receiving the second detection rays.

According to another aspect of the present disclosure, wherein the first ray emitter and the second ray emitter are configured to alternately emit the first detection rays and the second detection rays, and also configured such that the first detection rays and the second detection rays are located on the same plane, wherein the ray receiver is configured to receive the first detection rays and second detection rays emitted alternately.

According to another aspect of the present disclosure, wherein the movable frame is capable of adjusting a distance between the ray receiver and the first ray emitter.

According to another aspect of the present disclosure, wherein the ray detector comprises a gas ionization chamber, a scintillation detector, or a semiconductor detector.

According to another aspect of the present disclosure, the system further comprises a guide mechanism for guiding a movement of the movable frame.

With the security detection system according to the implementations of the present disclosure, the first ray emitter is provided below the detected object and emits the first detection rays towards the detected object from the bottom up. The first ray emitter is closer to the articles stored in the vehicle than the ray emitter provided above the top of the vehicle, thus facilitating the image of the detected object to be spread out. However, if the first ray emitter provided below the detected object is fixed, and the detected object is moved and scanned by dragged via the trailer, the trailer would be scanned into the bottom projection, thus influencing the imaging result. Therefore, the gantry frame according to the implementation of the present disclosure is provided to drive the first ray emitter and the detector to move synchronously along the guide mechanism, such that the first ray emitter and detector move from one end to the other end opposite to the one end of the detected object. In this case, the detected object can be scanned and detected without being dragged by the trailer, thus reducing the operation cost and improving the detection effects.

BRIEF DESCRIPTION OF THE DRAWINGS

The features, advantages, and technical effects of the illustrative implementations of the present disclosure will be described with reference to the drawings below, wherein.

Figure 1:
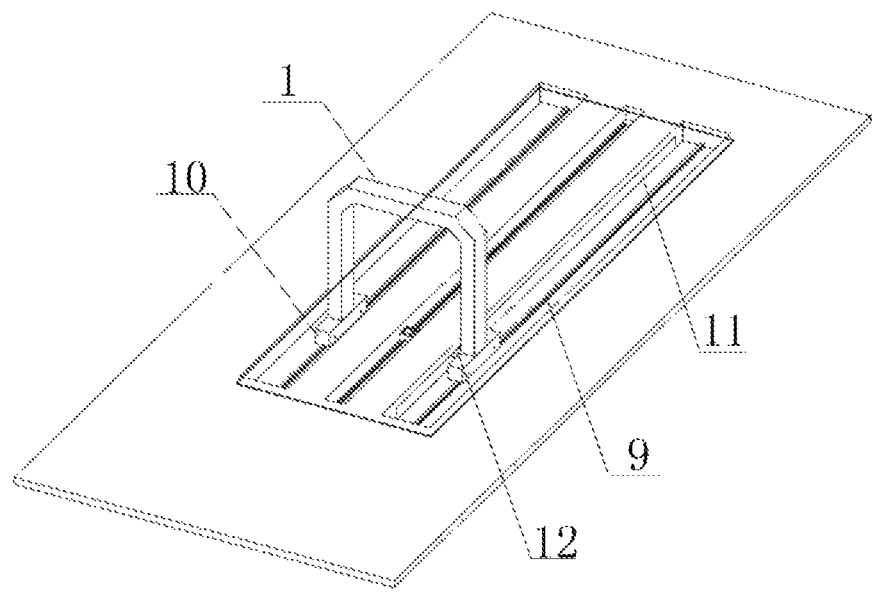
FIG. 1 is an isometric view of a security detection system according to one implementation of the present disclosure.

In the drawings, same reference numbers indicate similar elements, wherein 1 indicates a gantry frame, 2 indicates a upper beam. 3 indicates a side frame, 4 indicates a first ray emitter, S indicates a second ray emitter, 6 indicates a detector module. 7 indicates a first detector module, 8 indicates a second detector module, 9 indicates a linear guide way, 10 s indicates a transmission mechanism, 11 indicates a channel for moving, 12 indicates a connecting beam. 13 indicates a front collimator, 14 shows a detection passage, 15 indicates a first ray source, and 16 indicates a second ray source.

DETAILED DESCRIPTION

The technical solutions and advantages of the present disclosure will be further described in details by reference to implementations and the appended drawings. The implementations and appended drawings are used to exemplarily illustrate the principle of the present disclosure, and are not intended to limit the scope of the present disclosure. That is to say, the scope of the present disclosure is not limited to the preferred embodiments, but is merely limited by the claims.

In the description of the present disclosure, it should be noted that directions or positions indicated by terms "upper". "lower", "left", "right", and the like depend on the directions or positions shown in the figures, unless otherwise stated. These terms are used to facilitate and simplify description of the present disclosure, not intended to indicate or suggest that the devices or elements have to be located, configured and operated in particular directions, and thus not intended to limit the present disclosure. Besides, terms "first", "second", and the like are intended to describe, and should not construed as indicating or suggesting relative importance.

In the description of the present disclosure, unless otherwise clearly defined and limited, terms "mount" and "connect" shall be understood in a broad sense, for example, in a fixed, removable, or integrated manner, a mechanical or an electrical manner, in a direct manner or an indirect manner via an intermediate member. Those skilled in the art can understand the concrete meaning of the above terms in the present disclosure depending on particular situations.

A security detection system according to some implementations of the present disclosure is adapted for security detection for articles to be detected. The articles to be detected, which may be large-scale containers or vehicles loaded with goods, can be scanned by moving a ray emitter. The security detection system can detect not only the large-scale containers or vehicles loaded with goods, but also small-scale vehicles, packages, etc.

In order to better understand the present disclosure, the security detection system for the large-scale containers or vehicles loaded with goods according to the present disclosure is described in detail in combination of FIGS. 1-8.

Figure 2:
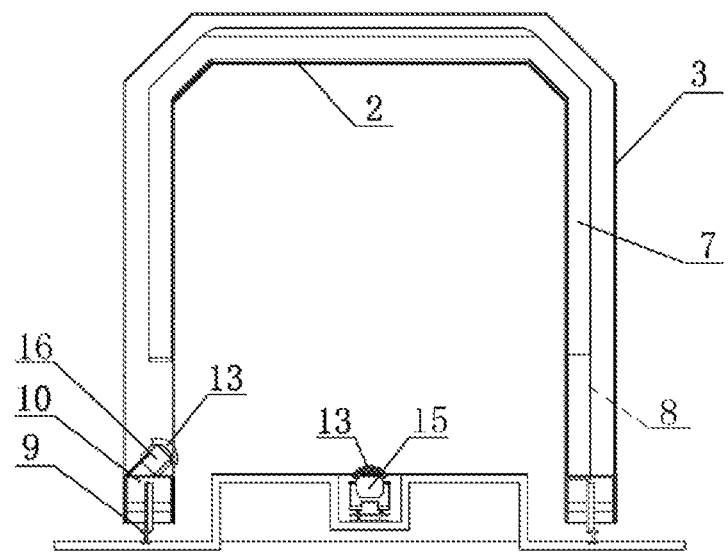
FIG. 2 is a front view of a security detection system according to one implementation of the present disclosure.
Figure 3:
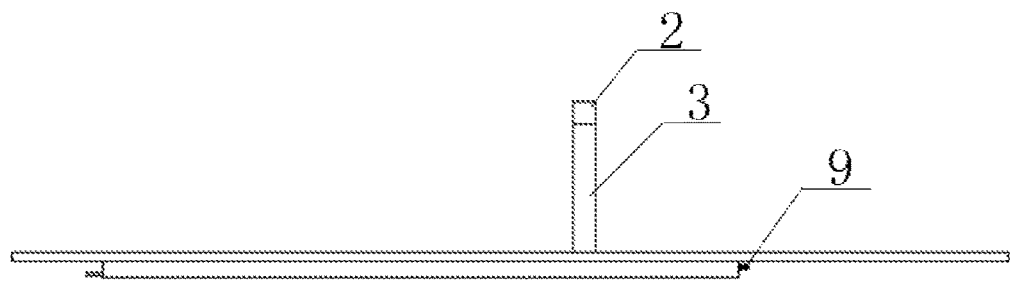
FIG. 3 is a left side view of a security detection system according to one implementation of the present disclosure.
Figure 4:
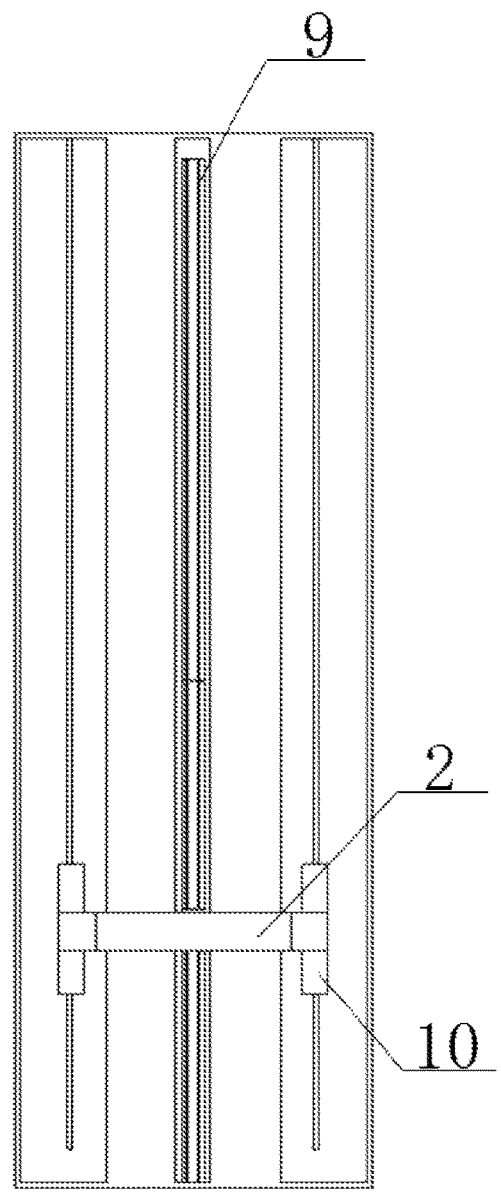
FIG. 4 is a top view of a security detection system according to one implementation of the present disclosure.

FIG. 1 is an isometric view of a security detection system according to one implementation of the present disclosure. FIG. 2 is a front view of a security detection system according to one implementation of the present disclosure. FIG. 3 is a left side view of a security detection system according to one implementation of the present disclosure. FIG. 4 is a top view of a security detection system according to one implementation of the present disclosure. In the security detection system for a truck, as shown in the figures, a detection device comprises a first ray emitter 4, a ray receiver, and a movable frame, wherein the first ray emitter 4 comprises a first ray source 15 for generating first detection rays, and is provided at a bottom of the movable frame such that the first detection rays can penetrate through a detected object from a bottom thereof, the ray receiver comprises a ray detector for correspondingly receiving the first detection rays having penetrated though the detected object, and is provided on the movable frame; and the movable frame can move in a direction in which the first ray emitter 4 and the ray receiver can move through a detection region for the detected object, such that the first ray emitter 4 and the ray detector can move from an end to the other end opposite to the one end of the detected object to detect the detected object.

According to some implementations of the present disclosure, the movable frame is a gantry frame 1 comprising an upper beam 2 and two side frames 3. The upper beam 2 and two side frames 3 constitute a door frame structure. It is necessary for the gantry frame 1 to have a height higher than an object to be detected to form a space for the object to be detected to pass through.

According to some implementations of the present disclosure, the first ray emitter 4 is provided below a detected object and configured to emit first detection rays upwardly, so that the first detection rays are transmitted to the detected object from the bottom up and the detector module 6 can receive a bottom projection of the detected object. In some implementations, the first ray source 15 is an isotopic ray source, wherein the isotope can be $^{60}$Co, $^{137}$Cs, $^{192}$Ir, or $^{75}$Se. In these implementations, the isotope is $^{60}$Co. A field angle of the first detection rays emitted by the isotopic ray source can be 60 degree or more, which is larger than a field angle of an accelerator used in the prior art. Therefore, the first ray emitter 4 can be provided closer to the detected object compared with the prior art. Thus, in the case that the first ray emitter 4 is provided below the detected object, the distance of the first ray emitter 4 from a ground surface can be shortened significantly, thus reducing difficulties of construction. Moreover, the first ray emitter 4 is closer to the detected object, which is beneficial for the image of the detected object to be spread out, and thus the detection personnel can easily identify and analyze the projected image.

Further, in the prior art where the ray emitter is provided on the top of the frame and an accelerator with a smaller field angle is used, it is necessary for the upper beam of the gantry frame 1 connected with the accelerator, to have a height significantly higher than the tallest detected object, or to be provided with a connecting member having a high enough height for connecting with the accelerator, such that the detection rays can cover and scan the whole detected object. Moreover, in the prior art, in the case that the ray emitter is provided on the top of the frame, a detector module 6 is correspondingly provided below the detected object. Generally, the detector module 6 is buried underground, resulting in that the detected object can be scanned merely by moving the detected object instead of moving the accelerator and the detector module 6. Thus, by providing the first ray emitter 4 below the detected object, the height of the gantry frame 1 can be significantly reduced, and thus the overall size of the gantry frame 1 and the security detection system can be reduced. Since the first ray emitter 4 is an isotopic ray source and has a relatively small volume and a small weight, it is easier to scan the detected object by the first ray emitter 4.

In the implementation shown in FIGS. 1-4, the first ray emitter 4 is provided in a central position below the detected object. However, the position of first ray emitter 4 is not limited to this. For example, the first ray emitter 4 can be provided on a left side or a right side of the central position below the detected object, as long as the first detection rays can be emitted upwardly and a bottom projection of the detected object obtained by projecting the detected object from the bottom thereof can be obtained.

Figure 5:
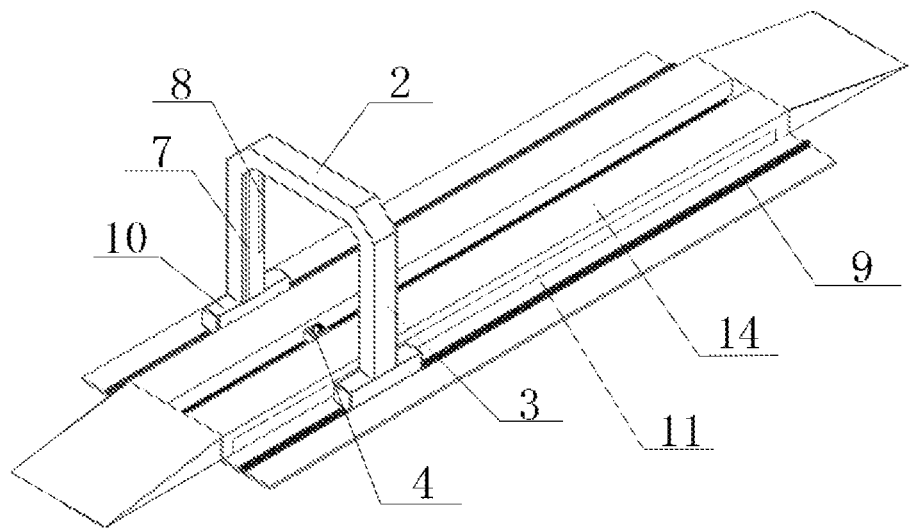
FIG. 5 is an axonometric view of a security detection system according to another embodiment of the present disclosure.

According to some implementations of the present disclosure, the first ray emitter 4 can be buried below a ground surface. In this case, a horizontal connecting beam 12 is provided to the bottom of either side frame of the gantry frame 1. A channel for moving 11 is provided below the ground surface in any suitable way such that the vehicle can stop on and pass through the ground surface above the channel for moving 11 and ensure bearing capacity of the ground surface there for the vehicle. The connecting beam 12 is provided within the channel for moving 11 below the ground surface and is movable along with the gantry frame 1. The first ray emitter 4 is fixed to the connecting beam 12, with a top portion of the first ray emitter 4 lower than the ground surface. In particular, a first groove is provided on the connecting beam 12, and the first ray emitter 4 can be fixed inside the first groove in any suitable form. FIG. 5 is an isometric view of the security detection system according to one implementation of the present disclosure. In the implementation shown in FIG. 5, a detection passage 14 for carrying the detected object can be erected on the ground surface. The detection passage 14 is in a form of arch bridge. In this case, the connecting beam 12 can be provided in a space between a bottom surface of the arch bridge and the ground surface.

According to some implementations of the present disclosure, the security detection system further includes a second ray emitter 5. The second ray emitter 5 comprises a second ray source 16 for generating second detection rays. The second ray emitter 5 is provided on one side of the detected object, and configured to emit such second detection rays that the second detection rays are emitted from one side to the other side of the detected object opposite to the one side to form a side projection. The first ray emitter 4 can be cooperated with the second ray emitter 5, so that the system can realize a stereoscopic radiation image by combining the side and bottom projections. Thus, specific shape, size, and density of the detected object can be shown stereoscopically, facilitating accurate and rapid identification of the type of the detected object. In some implementations, the second ray emitter 5 is an isotopic ray source. In some other implementations, the second ray source 16 can also be an X-ray emitter comprising an X-ray machine or an electron accelerator.

Figure 6:
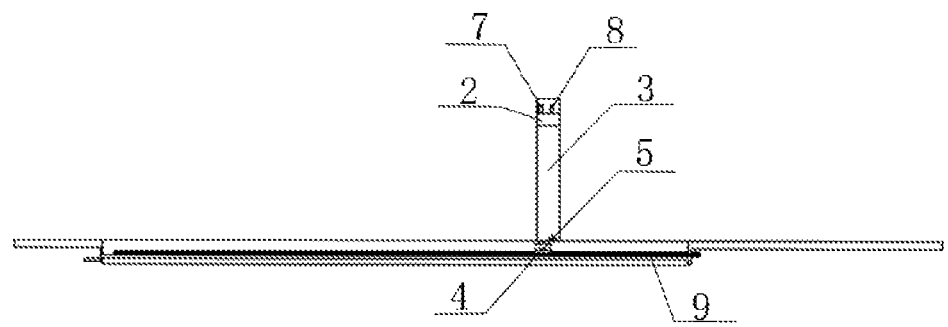
FIG. 6 is a schematic view of a ray receive module according to one implementation of the present disclosure.

In the implementation shown in FIG. 6, the second ray emitter 5 is fixed to the gantry frame 1, on a right side of a bottom portion of the detected object. However, the position of the second ray emitter 5 is not limited to this. For example, the second ray emitter 5 can be provided in any suitable positions on the right side or left side of the detected object, as long as the second detection rays can be emitted from one side to the other side opposite to the one side of the detected object and a side projection of the detected object can be obtained.

According to some implementations of the present disclosure, for example, the second ray emitter 5 is provided on a bottom portion of a right side frame 3 of the gantry frame 1, and a center of a sector region formed by the second detection rays is located on a ground surface. In some other implementations, the center of the sector region of the second detection rays can also be aligned with wheels of the vehicle in height. The position of the center can be adjusted according to actual requirements. Particularly, a second groove is provided on the bottom portion of the right side frame 3 of the gantry frame 1, and the second ray emitter 5 can be fixed within the second groove in any suitable form.

According to some implementations of the present disclosure, the first and second detection rays are distributed in a sector form respectively. In the case that an X-ray emitter serves as a ray emitter, since the X-ray emitter emits a conical ray beam, it is necessary to add a front collimator 13 at a ray emitting end of the X-ray emitter, so that the conical ray beam can be changed into detection rays in the sector form as required by the detection. In the case that the isotopic ray source is used as a ray emitter, since the ray emitter comprises a shield housing and isotopes provided inside the shield housing and the shield housing is provided with an emitting port in a slit form, rays emitted by the isotopic ray source can directly generate detection rays in the sector form as required by the detection. In the case that it is necessary for the isotope ray source to emit detection rays in the sector form more accurately, a front collimator 13 can be further provided at the emitting port of the shield housing. That is to say, each of the first emitter 4 and second emitter 5 can also comprises a front collimator 13.

According to some implementations of the present disclosure, the ray receiver module comprises ray detectors provided at a top wall and a side wall of the gantry frame 1, for receiving the first detection rays emitted by the first ray emitter 4 and the second detection rays emitted by the second ray emitter 5. The ray detectors can be any type of ionization chamber, proportional counter, Geiger-Muller counter, scintillation counter, semiconductor detector, and so on. Taking the reception of the first detection rays as an example, signals of all the first detection rays having penetrated through the detected object received by the ray detector are transmitted to a control device according to a position where the ray detector is located, thus obtaining a bottom projection of the detected object corresponding to the position where the first ray emitter 4 is located at the moment. A whole bottom projection of the detected object can be obtained by combining all the bottom projections from one end to the other end opposite to the one end of the detected object. The second detection rays are received and the side projection is obtained in the same way as for the first detection rays, and this no more details will be described here. After being obtained, the bottom and side projections of the detected object are filtered and their image information is combined and processed by the control unit, thus obtaining shape, position, structure, physical property such as density of the detected object, and so on. Also, the combined image can be displayed for detection personnel by a display device.

FIG. 6 is a schematic view of a structure of a ray receiver module according to an implementation of the present disclosure. In the implementation shown in FIG. 6, the first and second detection rays are located in different planes. That is to say, the first ray emitter 4 and second ray emitter 5 are correspondingly spaced a certain distance from each other in a direction perpendicular to the planes where the first and second detection rays are located, so that the first and second detection rays can be provided in two planes parallel to each other. In this case, the ray detector comprises a first detector module 7 for receiving the first detection rays and a second detector module 8 of receiving the second detection rays. The first detector module 7 and the second detector module 8 are provided on top and side walls of the gantry frame 1 parallel to each other. The first detector module 7 is provided corresponding to the first ray emitter 4, and the second detector module 8 is provided corresponding to the second ray emitter 5, to prevent the second detector from receiving the first detection rays incorrectly and to prevent the first detector from receiving the second detection rays incorrectly. In this case, the first detector module 7 has a length that allows all of the first detection rays to be received. Similarly the second detector module 8 has a length that allows all of the second detection rays to be received. In other implementations, a shielding device, for example, a lead bulk, for shielding is provided between the first and second detector, to further prevent the first and second detector from receiving interference signals, thus increasing the accuracy of the security detection system.

In some implementations, a rear collimator can be further provided at a front end of each of the first detector module 7 and second detector module 8, so that only rays having penetrated through the detected objects of the detection rays emitted from a corresponding ray source can enter into a corresponding ray detector, preventing scattered rays, and rays having penetrated through the detected objects and scattered rays of the detection rays emitted from other ray source from entering into this ray detector, and thus improving the image quality. Correspondingly, a front collimator 13 is added in front of the first ray source 15 and/or second ray source 16, to reduce width of the—fan-shaped ray beam in a scanning direction, to ensure that the first and second detectors merely detect their respective corresponding detection ray signals, to reduce crosstalk of the signals between the first and second detectors, improve the image quality and reduce the ambient radiation dose.

Figure 7:
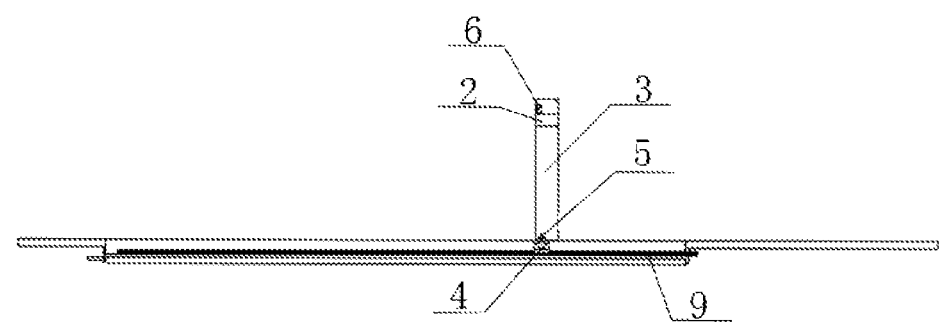
FIG. 7 is a schematic view of a ray receive module according to another implementation of the present disclosure.
Figure 8:
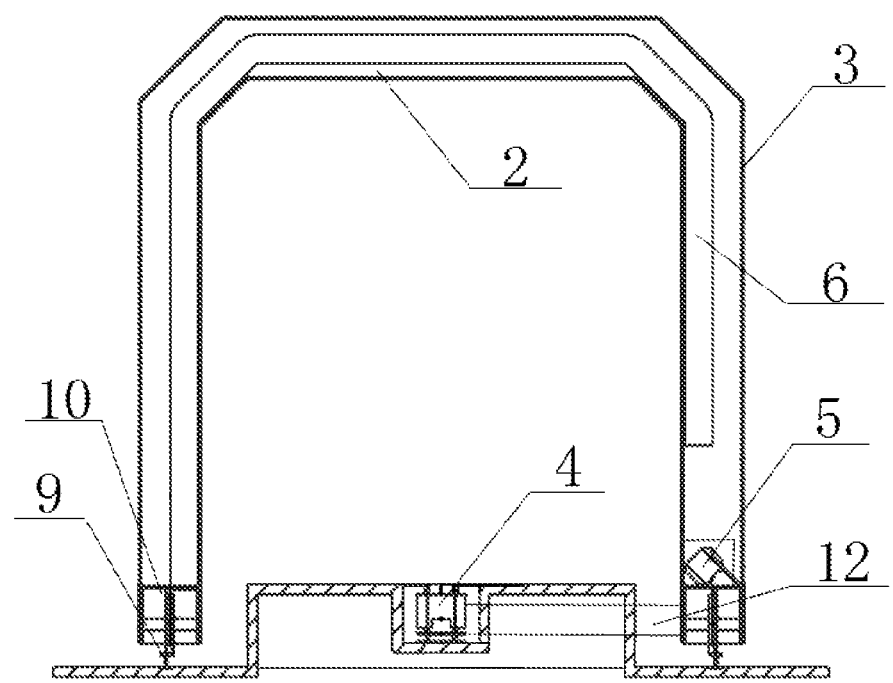
FIG. 8 is a front schematic view of the ray receive module according to the implementation in FIG. 7.

FIG. 7 is a schematic view of a structure of ray receiver modules according to an implementation of the present disclosure. FIG. 8 is a front schematic view of the ray receiver modules according to the implementation in FIG. 7. In the implementations shown by FIGS. 7-8, the first and second detection rays are located in a same plane. The ray detector merely comprises one detector module 6 for receiving first and second detection rays emitted alternately. That is to say, the security detection system is configured such that, the first ray emitter 4 and the second ray emitter 5 emit detection rays alternately, to prevent the detectors from receiving the first and second detection rays at the same time. Therefore, the detectors can be prevented from detecting interference signals, effectively increasing imaging accuracy of the security detection system. Further, at least a portion of detectors from the detector module 6 are configured to receive the first and second detection rays at different moments, and thus cost of the detectors can be saved.

According to the implementations of the present disclosure, in the case that both the first ray emitter 4 and the second ray emitter 5 are isotopic ray sources, alternately emitting the first and second detection rays can be realized by changing positions of the emitting ports or positions of the isotopes of the first ray emitter 4 and second ray emitter 5, to control emission of the rays emitted by the isotopes from the emitting ports.

For example, changing the positions of emitting ports of the first ray emitter 4 and second ray emitter 5 can be realized, by rotating the shield housings and thus the emitting ports of the first ray emitter 4 and second ray emitter 5 while keeping the isotopes in fixed positions, and thus changing relative positions of the emitting ports and the isotopes. Changing the positions of the isotopes of the first ray emitter 4 and the second ray emitter 5 can be realized, by moving the isotopes in a rotatable or reciprocal manner while keeping the shield housings of the first ray emitter 4 and second ray emitter 5 in fixed positions, and thus changing relative positions of the emitting ports and the isotopes.

In other implementations, for example, in the case that the second ray emitter 5 is an X-ray emitter, the second ray emitter 5 can be digitally controlled. The emission of the detection rays from the second ray emitter 5 can be controlled by controlling trigger signals. The detection rays can be emitted by the second ray emitter 5 at regular intervals, as long as the trigger signals are controlled to be emitted at regular intervals.

According to some implementations of the present disclosure, the detector module 6 is a ray detector of which the type comprises a gas ionization chamber, a scintillation detector, or a semiconductor detector. In the case that the detector module 6 is a scintillation detector or a semiconductor detector, since it is omnidirectional, the portion of the side frame 3 of the gantry frame 1 lower than the detector can be provided as a structure of which a height is adjustable, that is, can be provided with an extendable structure, such that the detector module 6 can get away from or close to the first ray emitter 4. In the case that the detected object has a relatively large volume, the height of the detector module 6 can be increased, and in the case that the detected object has a relatively small volume, the height of the detector module 6 can be decreased. Therefore, the intensity of rays received by the detector module 6 can be increased, thus improving the image quality.

FIG. 2 is a front view of the security detection system according to an implementation of the present disclosure. FIG. 4 is a top view of the security detection system according to an implementation of the present disclosure. FIG. 2 and FIG. 4 show a guide mechanism according to the implementations of the present disclosure. In the implementation, the guide mechanism is a linear guide way 9. The gantry frame 1 is movably connected with the linear guide way 9, and a movement of the gantry frame 1 is controlled by a transmission mechanism 10. The transmission mechanism 10 comprises idler wheels and a drive motor, or can be any structure by which the gantry frame 1 can drive the first ray emitter 4, the second ray emitter 5, and the detector module 6 to move synchronously.

According to some implementations of the present disclosure, the gantry frame 1 can drive the first ray emitter 4, the second ray emitter 5, and the detector to move synchronously along the guide mechanism, from one end to the other end opposite to the one end of the detected object. Thus, and the detection can be performed without dragging the detected object by a trailer. Therefore, operating costs can be reduced and detection efficiency can be improved.

In other implementations, the number of the detection devices can be two. In this case, the number of the gantry frames 1 can be two. The two gantry frames 1 are arranged side by side and can be moved synchronously, so that when the gantry frames 1 move for one time, two detected objects can be detected at the same time. Alternatively, when the gantry frames 1 move for one time, front and rear portions of the detected object can be detected respectively, thus improving the detection efficiency. The detection devices can also have a larger quantity, and can be moved synchronously. In this case, when the gantry frame 1 moves for one time, more detected objects can be detected at the same time or the detection efficiency can be further improved.

For example, in the case that the number of the gantry frames 1 is two, the two gantry frames 1 can be arranged side by side in a direction perpendicular to their moving direction, with the side frames of the two gantry frames 1 close to each other combined into a single side frame or fixedly connected with each other, so that the two gantry frames 1 can be moved synchronously. A first ray emitter 4 is mounted at a bottom of each gantry frame 1, and the two gantry frames 1 share a common second ray emitter 5, which is provided on the side frame located between the two gantry frames 1. In this case, the second ray emitter 5 is provided with two emitting ports, and can emit second detection rays to a right and left sides at the same time, so that the two gantry frames 1 can detect a detected object by a side projection via the second ray emitter 5. Therefore, two detected objects are detected at the same time when the two gantry frame 1 move for one time and the detection efficiency can be improved.

For example, in the case that the number of the gantry frames 1 is two, the two gantry frames 1 can be arranged side by side in their moving direction, and can move synchronously towards a same direction. In this case, each of the gantry frames 1 is provided with a first ray emitter 4 and a second ray emitter 5, so that when the gantry frames 1 move for one time, the from and rear portions of the detected object in the moving direction are detected at the same time and the detection efficiency can be improved. However, those skilled in the art also can easily think of that the two gantry frames 1 move in reverse directions at a same speed. Particularly, the two gantry frames 1 can move from two ends of the detected object to a middle portion thereof, or from the middle portion of the detected object to two ends of the detected object, as long as it is realized that when the two gantry frames 1 moves for one time, different portions of the detected object can be detected respectively, and the projections obtained via each gantry frame 1 can be eventually combined into a projection of the detected object.

The implementations of the present disclosure describing and illustrating the contents protected by the present disclosure are illustrative and not limiting. Thus, it should be understood that the above implementations merely illustrate and describe the preferred technical solutions of the present disclosure, and all of the modified and equivalent configurations within the scope limited by the appended claims belong to the contents protected by the present disclosure.

What is claimed is:

1. A security detection system, comprising a first ray emitter, a ray receiver, and a movable frame, wherein
   the first ray emitter comprises a first ray source for generating first detection rays and is provided at a bottom portion of the movable frame, so that the first detection rays penetrate through a detected object from the bottom up;
   the ray receiver comprises a ray detector provided on the movable frame, for correspondingly receiving the first detection rays having penetrated through the detected object; and
   the movable frame is configured to move so that the first ray emitter and the ray receiver synchronously move from one end of the detected object to the other end thereof with the movement of the movable frame,
   wherein the first ray emitter is configured to move across the detected object at a central position on a bottom side of the detected object, and
   the first ray emitter is fixedly connected to a connecting beam, and the connecting beam is configured to extend horizontally and connect to either side beam of the movable frame and be able to move within a channel provided below a ground surface synchronously with the movement of the movable frame.

2. The security detection system according to claim 1, wherein the first ray source is an isotopic ray source.

3. The security detection system according to claim 2, wherein the isotopic ray source comprises $^{60}$Co, $^{137}$Cs, $^{192}$Ir, or $^{75}$Se.

4. The security detection system according to claim 1, further comprises:
   a second ray emitter comprising a second ray source for generating second detection rays, wherein the second ray emitter is provided on the movable frame such that the second detection rays are capable of penetrating through the detected object from a side of the detected object,
   wherein the ray receiver is configured to correspondingly receive the second detection rays having penetrated through the detected object, and the movable frame is configured to move so that the second ray emitter and the ray receiver synchronously move from one end of the detected object to the other end thereof with the movement of the movable frame.

5. The security detection system according to claim 4, wherein the second ray source is an isotopic ray source or an X-ray emitter.

6. The security detection system according to claim 5, wherein the isotopic ray source comprises $^{60}$Co, $^{137}$Cs, $^{192}$Ir, or $^{75}$Se, and the X-ray emitter comprises an X-ray machine or an electron accelerator.

7. The security detection system according to claim 4, wherein the first detection rays and the second detection rays both are distributed in a substantially planar fan shape.

8. The security detection system according to claim 4, wherein the first ray emitter and the second ray emitter are configured such that the first detection rays and the second detection rays are located in different planes, and the ray receiver comprises a first detector module for receiving the first detection rays and a second detector module for receiving the second detection rays.

9. The security detection system according to claim 4, wherein the first ray emitter and the second ray emitter are configured to alternately emit the first detection rays and the second detection rays, and also configured such that the first detection rays and the second detection rays are located in the same plane, wherein the ray receiver is configured to receive the first detection rays and second detection rays emitted alternately.

10. The security detection system according to claim 1, wherein the movable frame is capable of adjusting a distance between the ray receiver and the first ray emitter.

11. The security detection system according to claim 2, wherein the ray detector comprises a gas ionization chamber, a scintillation detector, or a semiconductor detector.

12. The security detection system according to claim 1, further comprises:
a guide mechanism for guiding a movement of the movable frame.

13. The security detection system according to claim 2, wherein a field angle of the first detection rays is larger than or equal to 60 degree.

14. The security detection system according to claim 3, wherein a field angle of the first detection rays is larger than or equal to 60 degree.

15. A security detection system, comprising a first ray emitter, a ray receiver, and a movable frame, wherein
the first ray emitter comprises a first ray source for generating first detection rays and is provided at a bottom portion of the movable frame, so that the first detection rays penetrate through a detected object from the bottom up;
the ray receiver comprises a ray detector provided on the movable frame, for correspondingly receiving the first detection rays having penetrated through the detected object; and
the movable frame is configured to move so that the first ray emitter and the ray receiver synchronously move from one end of the detected object to the other end thereof with the movement of the movable frame,
wherein the first ray emitter is configured to move across the detected object at a central position on a bottom side of the detected object, and
the first ray emitter is fixedly connected to a connecting beam, which is configured to extend horizontally and connect to either side beam of the movable frame, and a detection passage for supporting the detected object is disposed on a ground surface and is formed in a shape of arch bridge, wherein the connecting beam is configured to be able to move within a space between a bottom surface of the detection passage and the ground surface synchronously with the movement of the movable frame.

16. The security detection system according to claim 15, wherein the first ray source is an isotopic ray source.

17. The security detection system according to claim 16, wherein the isotopic ray source comprises $^{60}$Co, $^{137}$Cs, $^{192}$Ir, or $^{75}$Se.

18. The security detection system according to claim 15, further comprises:
a second ray emitter comprising a second ray source for generating second detection rays, wherein the second ray emitter is provided on the movable frame such that the second detection rays are capable of penetrating through the detected object from a side of the detected object,
wherein the ray receiver is configured to correspondingly receive the second detection rays having penetrated through the detected object, and the movable frame is configured to move so that the second ray emitter and the ray receiver synchronously move from one end of the detected object to the other end thereof with the movement of the movable frame.

19. The security detection system according to claim 18, wherein the second ray source is an isotopic ray source or an X-ray emitter.

20. The security detection system according to claim 19, wherein the isotopic ray source comprises $^{60}$Co, $^{137}$Cs, $^{192}$Ir, or $^{75}$Se, and the X-ray emitter comprises an X-ray machine or an electron accelerator.

21. The security detection system according to claim 18, wherein the first detection rays and the second detection rays both are distributed in a substantially planar fan shape.

22. The security detection system according to claim 18, wherein the first ray emitter and the second ray emitter are configured such that the first detection rays and the second detection rays are located in different planes, and the ray receiver comprises a first detector module for receiving the first detection rays and a second detector module for receiving the second detection rays.

23. The security detection system according to claim 18, wherein the first ray emitter and the second ray emitter are configured to alternately emit the first detection rays and the second detection rays, and also configured such that the first detection rays and the second detection rays are located in the same plane, wherein the ray receiver is configured to receive the first detection rays and second detection rays emitted alternately.

24. The security detection system according to claim 15, wherein the movable frame is capable of adjusting a distance between the ray receiver and the first ray emitter.

25. The security detection system according to claim 16, wherein the ray detector comprises a gas ionization chamber, a scintillation detector, or a semiconductor detector.

26. The security detection system according to claim 15, further comprises:
a guide mechanism for guiding a movement of the movable frame.

27. The security detection system according to claim 16, wherein a field angle of the first detection rays is larger than or equal to 60 degree.

28. The security detection system according to claim 17, wherein a field angle of the first detection rays is larger than or equal to 60 degree.

* * * * *